(12) United States Patent
Ikeno

(10) Patent No.: US 10,634,969 B2
(45) Date of Patent: Apr. 28, 2020

(54) LIQUID CRYSTAL DISPLAY APPARATUS AND CONTROL CIRCUIT

(71) Applicant: Tianma Japan, Ltd., Kawasaki, Kanagawa (JP)

(72) Inventor: Hidenori Ikeno, Kawasaki (JP)

(73) Assignee: TIANMA MICROELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 15/834,300

(22) Filed: Dec. 7, 2017

(65) Prior Publication Data

US 2018/0164614 A1 Jun. 14, 2018

(30) Foreign Application Priority Data

Dec. 14, 2016 (JP) ................. 2016-242273

(51) Int. Cl.
| G02F 1/137 | (2006.01) |
| G02F 1/1333 | (2006.01) |
| G02F 1/1343 | (2006.01) |
| G02F 1/133 | (2006.01) |
| G02F 1/1368 | (2006.01) |
| G09G 3/36 | (2006.01) |
| G09G 3/20 | (2006.01) |

(52) U.S. Cl.
CPC ............ *G02F 1/137* (2013.01); *G02F 1/1368* (2013.01); *G02F 1/13306* (2013.01); *G02F 1/13439* (2013.01); *G02F 1/133345* (2013.01); *G02F 1/134309* (2013.01); *G02F 1/134363* (2013.01); *G09G 3/20* (2013.01); *G09G 3/36* (2013.01); *G09G 3/3648* (2013.01); *G02F 2001/13706* (2013.01); *G02F 2001/13712* (2013.01); *G02F 2001/134372* (2013.01); *G09G 2320/0276* (2013.01); *G09G 2320/068* (2013.01)

(58) Field of Classification Search
CPC ...................................................... G02F 1/137
See application file for complete search history.

(56) References Cited

U.S. PATENT DOCUMENTS

| 2013/0188106 A1* | 7/2013 | Nishida ............. G02F 1/133512 349/33 |
| 2016/0260388 A1* | 9/2016 | Yata ...................... G09G 3/3406 |
| 2017/0139290 A1* | 5/2017 | Iwata ..................... G02F 1/1368 |

FOREIGN PATENT DOCUMENTS

JP        2013-137488 A     7/2013

* cited by examiner

*Primary Examiner* — Edmond C Lau
(74) *Attorney, Agent, or Firm* — Sughrue Mion, PLLC

(57) ABSTRACT

In a liquid crystal display apparatus in which a first substrate and a second substrate are disposed in parallel to each other through a liquid crystal layer, a liquid crystal molecule in the liquid crystal layer is rotated in a plane parallel to the first substrate and the second substrate by driving voltage applied to the liquid crystal layer. A voltage value corresponding to a maximum gradation value of the driving voltage applied to the liquid crystal layer is a driving voltage value at which transmittance peaks based on V-T characteristics in an inclination direction inclined from a normal direction of a display surface of the liquid crystal display apparatus to a direction in which a refractive index of the liquid crystal layer is maximum.

19 Claims, 9 Drawing Sheets

F I G. 6
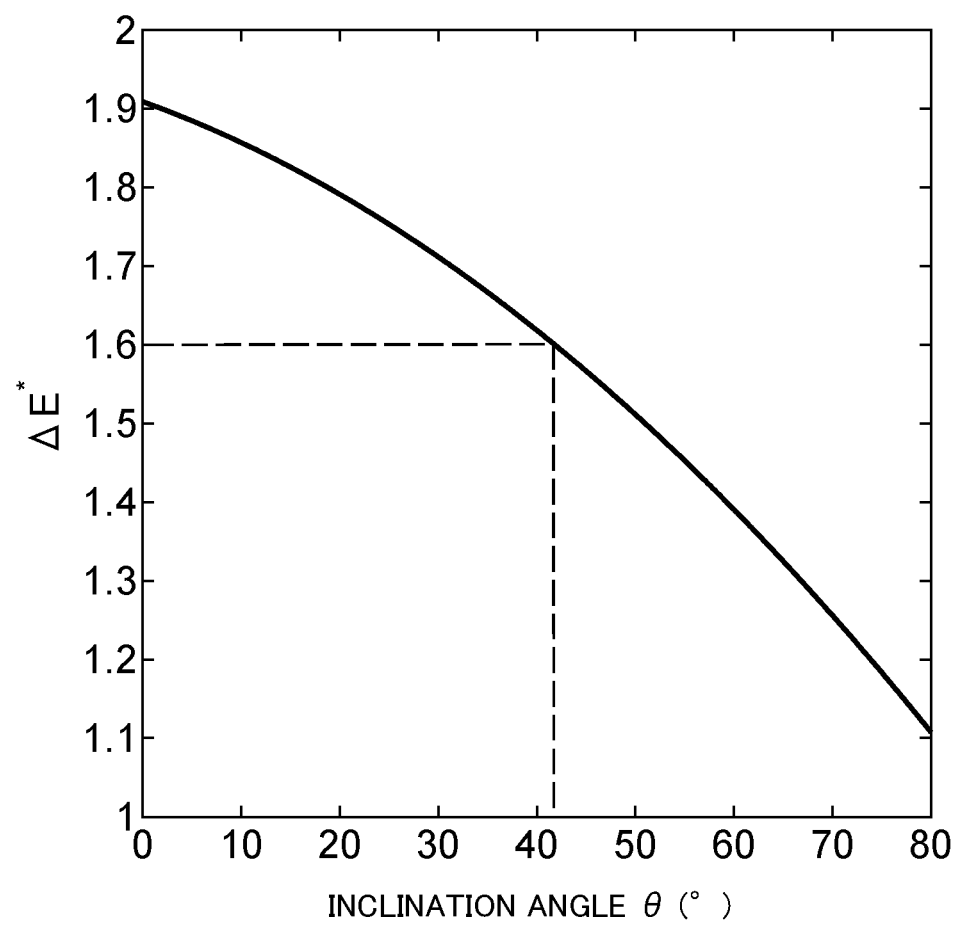

F I G. 8

LIQUID CRYSTAL DISPLAY APPARATUS AND CONTROL CIRCUIT

CROSS-REFERENCE TO RELATED APPLICATION

This non-provisional application claims priority under 35 U.S.C. § 119(a) on Patent Application No. 2016-242273 filed in Japan on Dec. 14, 2016, the entire contents of which are hereby incorporated by reference.

FIELD

The present disclosure relates to a liquid crystal display apparatus of a transverse electric field type and to a control circuit.

BACKGROUND

In the liquid crystal display apparatus of a transverse electric field type such as in-plane switching (IPS) or fringe field switching (FFS), an electric field substantially parallel to a substrate is applied to a liquid crystal layer so as to rotate a liquid crystal molecule in a plane parallel to the substrate to control the transmittance of the liquid crystal layer.

Compared to the IPS liquid crystal display apparatus, it is known that the FFS liquid crystal display apparatus has a large chromatic difference between the case where an observation point in the display surface is viewed from a normal direction against the display surface and the case where the observation point is viewed from a direction inclined from the normal direction toward the initial alignment direction of liquid crystal molecules with respect to the observation point (diagonal direction). Thus, the FFS liquid crystal display apparatus has a problem of deteriorated image quality when viewed from the diagonal direction. Such degradation in quality is caused by the characteristics of standardized transmittance with respect to the voltage applied to the liquid crystal layer being shifted to the low voltage side if the point of view is moved from a point in the normal direction to a point in the diagonal direction.

SUMMARY

Japanese Patent Application Laid-Open No. 2013-137488 has proposed a configuration for suppressing the characteristics of standardized transmittance with respect to the applied voltage being shifted to the low voltage side if the point of view is moved from a point in the normal direction of the display surface to a point in the diagonal direction in the FFS display apparatus. This can realize a display apparatus having superior viewing angle characteristics.

However, it is difficult for the technique disclosed in Japanese Patent Application Laid-Open No. 2013-137488 to avoid a complicated configuration, since one pixel is constituted by two regions having liquid crystal elements with different initial alignment directions.

A liquid crystal display apparatus according to one aspect of the present disclosure comprises: a first substrate; a first electrode formed on the first substrate; an insulating film formed on the first electrode; a second electrode formed on the insulating film; a liquid crystal layer located on the second electrode; and a second substrate disposed in parallel to the first substrate on the liquid crystal layer. A liquid crystal molecule in the liquid crystal layer is rotated in a plane parallel to the first substrate by driving voltage applied through the first electrode and the second electrode. The first electrode is a plate-shaped transparent electrode that overlaps with a plurality of openings of the second electrode. A voltage value corresponding to a maximum gradation value of the driving voltage is a driving voltage value for maximizing transmittance of the liquid crystal layer in the case where the observation point is viewed from a point on an inclined line inclined from an orthogonal line passing the observation point and being orthogonal to the first substrate by a predetermined inclination angle which is less than 90 degrees with respect to the observation point in a plane orthogonal to the first substrate, which includes a straight line in a direction passing an observation point on the first substrate and allowing a refractive index of the liquid crystal layer to be maximum.

It is to be understood that both the foregoing general description and the following detailed description are exemplary and explanatory and are not restrictive of this disclosure.

BRIEF DESCRIPTION OF THE DRAWINGS

FIG. 6 is a graph illustrating dependency of an index value ΔE* of variation in image quality in the case where the driving voltage for the liquid crystal display panel is decided based on V-T characteristics in the inclination directions with different inclination angles;

FIG. 8 is a schematic view illustrating a configuration example of a switching table.

DETAILED DESCRIPTION

A liquid crystal display apparatus according to the present disclosure will now be described below with reference to the drawings illustrating the embodiments thereof. It is noted that the ordinal numbers such as "first" and "second" in the specification and claims are denoted for the purpose of clarifying the relationship between elements and preventing the mix-up of elements. These ordinal numbers are therefore not to limit the number of elements.

Moreover, the dimensions, proportions and the like of the illustrated components may not always correspond to the actual components. For the convenience of illustration, some elements included in the actual components may not be illustrated, or the dimensions of the illustrated components may be exaggerated compared to those of the actual components.

Embodiment 1

Figure 1:
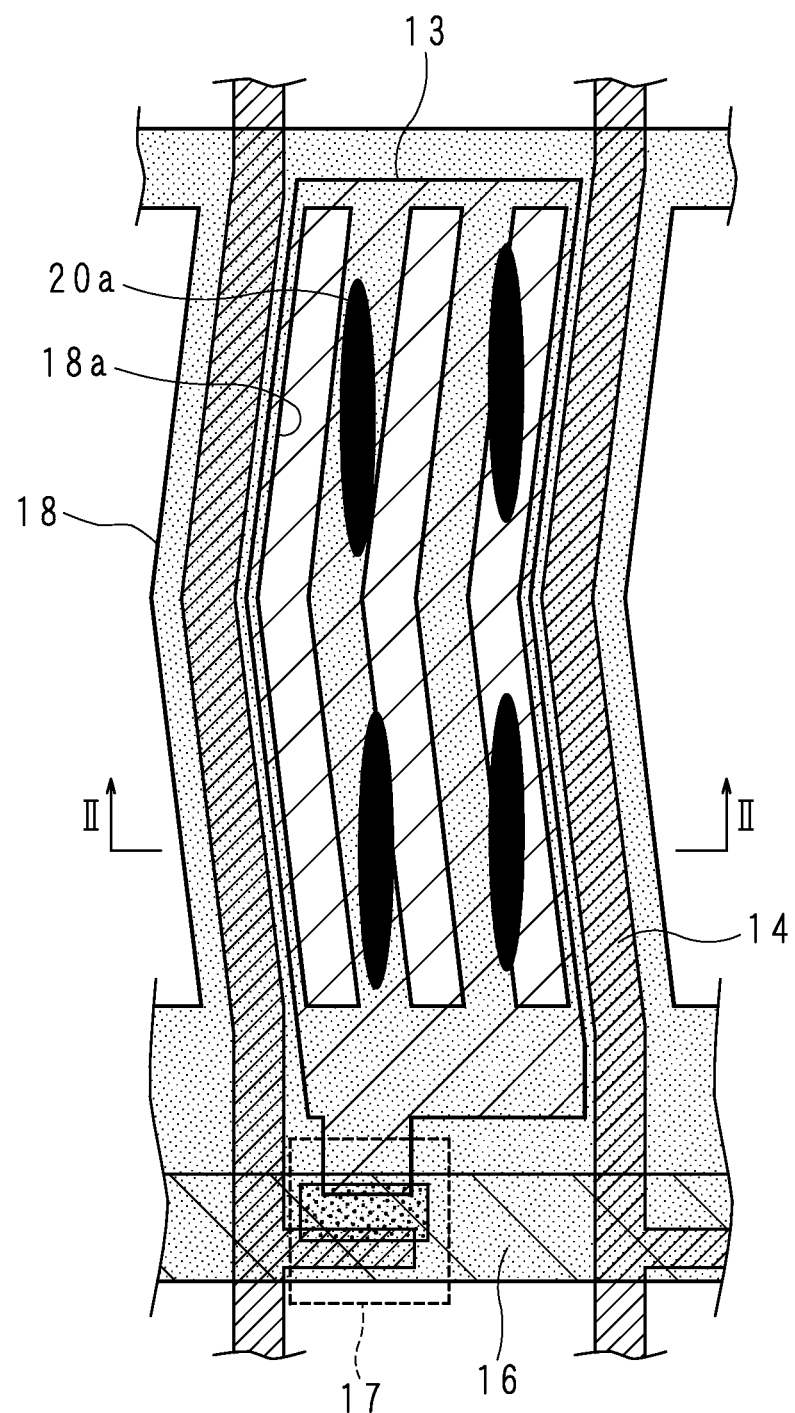
FIG. 1 is a plan view illustrating a configuration example of a liquid crystal display panel according to Embodiment 1.

FIG. 1 is a plan view illustrating a configuration example of a liquid crystal display panel according to Embodiment 1.

Figure 2:
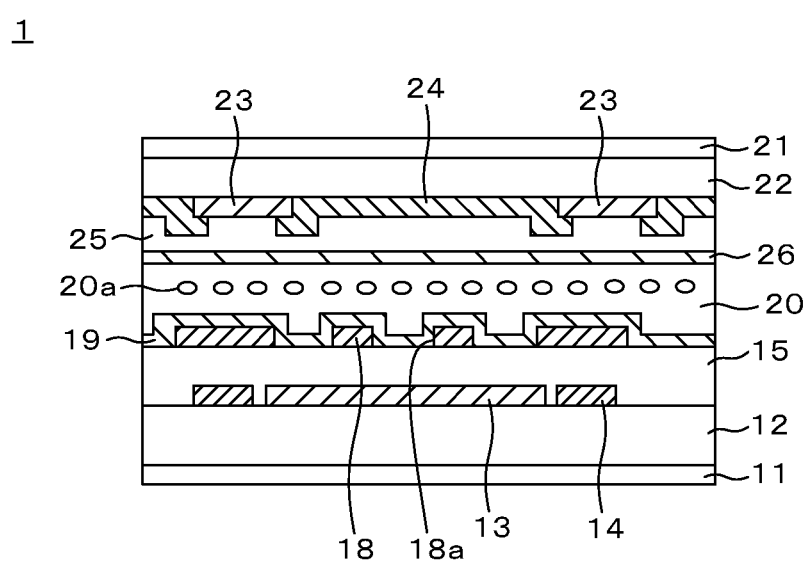
FIG. 2 is a cross-section view along the line II-II in FIG. 1.

FIG. 2 is a cross-section view along the line II-II in FIG. 1. A liquid crystal display panel 1 according to Embodiment 1 is an FFS liquid crystal display panel of the transverse electric field driving type. A configuration example of one pixel is illustrated in FIG. 1 and FIG. 2.

The liquid crystal display panel 1 according to Embodiment 1 is so configured that a first substrate 12 and a second substrate 22 are disposed in parallel to each other with a liquid crystal layer 20 interposed between them. For example, the first substrate 12 and the second substrate 22 are transparent insulating substrates such as glass substrates. FIG. 1 illustrates index ellipsoids representing the aggregation of liquid crystal molecules forming the liquid crystal layer 20 as liquid crystal molecules 20a, and also illustrates a first electrode 13, a second electrode 18, a signal wiring 14 and a scanning wiring 16 that are located on the first substrate 12, but it omits the illustration of the second substrate 22.

In the liquid crystal display panel 1 illustrated in FIG. 2, a polarization plate 11 is disposed on the lower surface of the first substrate 12. On the upper surface of the first substrate 12, multiple signal wirings (data lines) 14 are formed in parallel to each other, while the first electrode (pixel electrode) 13 of a plate-like shape is formed in a region between adjacent signal wirings 14. In the example illustrated in FIG. 1, the signal wiring 14 extends in the upper-lower direction, and is formed in a long and thin shape somewhat inclined relative to the upper-lower direction.

An insulating film 15 is formed on the upper surfaces of the first electrode 13 and the signal wirings 14, and scanning wirings (gate lines) 16 are formed in parallel to each other so as to be orthogonal to the signal wirings 14 with the insulating film 15 interposed between them. Furthermore, the second electrode (common electrode) 18 is formed on the upper surface of the insulating film 15. The second electrode 18 is formed in the shape of a plate covering the signal wirings 14, the scanning wirings 16 and the first electrode 13, and has multiple openings 18a (three in FIGS. 1 and 2) at positions overlapping the first electrode 13. The opening 18a of the second electrode 18 is formed in a long and thin tilted shape somewhat inclined relative to the upper-lower direction, as in the signal wiring 14. The second electrode 18 may be formed in a comb-like shape, other than the configuration having the openings 18a. The first electrode 13 and the second electrode 18 are preferably transparent electrodes. This is because the area through which light transmits increases. An alignment film 19 is formed on the upper surface of the second electrode 18.

On the other hand, a polarization plate 21 is disposed on the upper surface of the second substrate 22. At the lower surface of the second substrate 22, a black matrix 23 and a color layer 24 are formed. The black matrix 23 is formed in a band-like shape in a region overlapping the signal wirings 14, and the color layer 24 of RGB (Red, Green and Blue) is formed in a region other than the region where the black matrix 23 is formed. The lower surfaces of the black matrix 23 and the color layer 24 are covered with an overcoat layer 25, and an alignment film 26 is further formed on the lower surface of the overcoat layer 25.

As described above, the first substrate 12 and the second substrate 22 configured as described above are bonded together through the liquid crystal layer 20 in the state where the respective alignment films 19 and 26 are opposed to each other. Thus, the liquid crystal layer 20 is disposed on the upper surface of the second electrode 18, and the second substrate 22 is disposed on the upper surface of the liquid crystal layer 20 in parallel to the first substrate 12, to complete the liquid crystal display panel 1 as illustrated in FIG. 2.

Here, the black matrix 23 is not necessarily need to exist, which may not be formed or may be formed by placing one of adjacent color layers 24 over the other. In the case where color display is not necessary, no specific problem arises even without the color layer 24. Even in the case of employing the configuration as described above, the effect of the present disclosure will not be lost.

In the liquid crystal display panel 1, voltage (driving voltage) is applied to the liquid crystal layer 20 through the first electrode 13 and the second electrode 18. If voltage is applied to the liquid crystal layer 20, the liquid crystal molecules 20a in the liquid crystal layer 20 rotate in a plane parallel to the first substrate 12 and the second substrate 22. This controls the transmittance in the liquid crystal layer 20.

If no voltage is applied to the liquid crystal layer 20, the liquid crystal molecules 20a in the liquid crystal layer 20 are controlled for their alignment directions (initial alignment directions) by the alignment films 19 and 26. In Embodiment 1, the liquid crystal layer 20 is controlled to be homogeneously (horizontally) aligned, so that the direction in which the refractive index in the liquid crystal layer 20 is maximum corresponds to the alignment direction. It is noted that the longitudinal direction of the liquid crystal molecules 20a corresponds to the alignment direction of the liquid crystal molecules 20a.

Figure 3A:
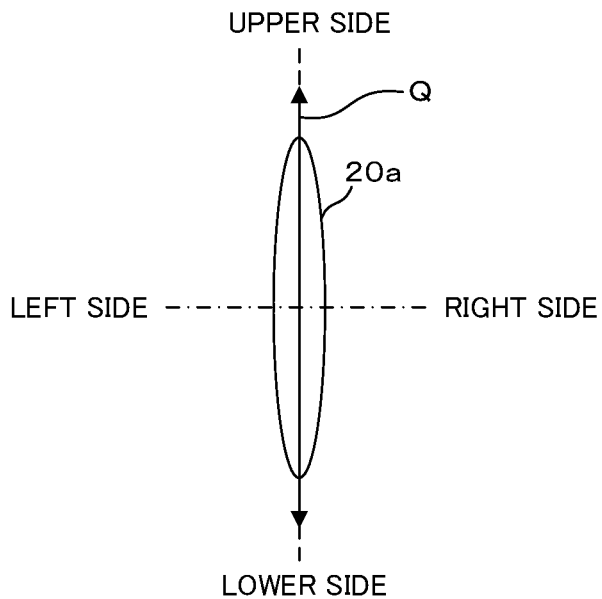
FIG. 3A is a schematic view illustrating definitions of directions in Embodiment 1.
Figure 3B:
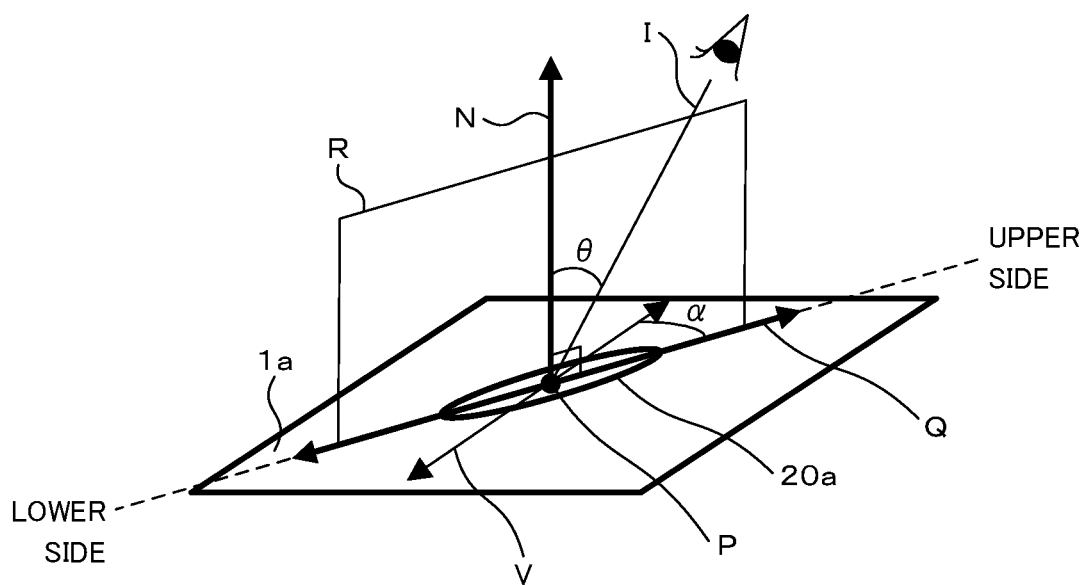
FIG. 3B is a schematic view illustrating definitions of directions in Embodiment 1.

Now, directions used in Embodiment 1 will be described. FIGS. 3A and 3B are schematic views illustrating the definitions of directions in Embodiment 1. FIG. 3A is a plan view of a liquid crystal molecule 20a viewed from a normal direction N of a display surface 1a of the liquid crystal display panel 1, whereas FIG. 3B is a schematic view of a liquid crystal molecule 20a viewed from a diagonal direction. It is noted that FIG. 3B illustrates the liquid crystal molecule 20a with a pretilt angle of 0 degrees.

A point P in FIG. 3B indicates an arbitrary observation position in a display surface 1a of the liquid crystal display panel 1. Hereinafter, P is referred to as observation position P. A direction V in FIG. 3B indicates a vertical direction in the display surface 1a in this case. The direction V may alternatively be a horizontal direction in the display surface 1a in accordance with the other situation where the liquid crystal display panel 1 is used. Hereinafter, V is referred to as vertical direction V. Furthermore, a direction Q indicates the direction in which the refractive index in the liquid crystal layer 20 is maximum, and the direction Q corresponds to an alignment direction of the liquid crystal molecule 20a controlled by the alignment films 19 and 26 in Embodiment 1. Hereinafter, Q is referred to as alignment direction Q. For example, the alignment direction Q crosses the vertical direction V in the display surface 1a by a crossing angle α.

The direction N in FIG. 3B is the normal direction relative to the display surface 1a, and indicates a direction of the orthogonal line which passes an observation position P and is orthogonal to the display surface 1a (first substrate 12 and second substrate 22). Hereinafter, N is referred to as normal direction N. A plane R in FIG. 3B indicates a plane which includes a straight line in the alignment direction Q passing the observation position P and is orthogonal to the display surface 1a (first substrate 12 and second substrate 22). That is, the plane R and the display surface 1a are orthogonal to each other at the straight line in the alignment direction Q passing the observation position P.

In FIG. 3A, the liquid crystal molecule 20a is illustrated such that the alignment direction Q thereof corresponds to the upper-lower direction. The upper side of the alignment direction Q means the upper side in FIG. 3A, whereas the lower side of the alignment direction Q means the lower side in FIG. 3A. One side of the alignment direction Q may be expressed as the upper side, whereas the other side thereof may be expressed as the lower side. Furthermore, the dashed-dotted line in FIG. 3A indicates the direction being orthogonal to the alignment direction Q on the display surface 1a. Accordingly, the left side of the alignment direction Q means the left side in FIG. 3A, whereas the right side of the alignment direction Q means the right side in FIG. 3A.

A direction I in FIG. 3B indicates a direction of an inclined line (inclination direction) which is inclined from the normal direction N with respect to the observation position P by an inclination angle θ in the plane R. Hereinafter, I is referred to as inclination direction I. In FIG. 3B, the inclination direction I indicates the direction of an inclined line which is inclined from the normal direction N to the upper side of the alignment direction Q with respect to the observation position P. However, the inclination direction I may be a direction of an inclined line which is inclined toward the lower side of the alignment direction Q with respect to the observation position P.

In Embodiment 1, the liquid crystal molecule 20a is of a positive type, and the refractive index maximum direction (longitudinal direction) of the index ellipsoid represented by the liquid crystal molecule 20a matches the direction where the liquid crystal molecule 20a has a maximum dielectric. In Embodiment 1, the alignment direction Q of the liquid crystal molecule 20a is substantially parallel to the extending direction of the signal wiring (data line) 14 in each pixel, as illustrated in FIG. 1. Moreover, in other words, the alignment direction Q of the liquid crystal molecule 20a may also be a direction substantially orthogonal to the scanning wiring (gate line) 16 in each pixel. It is noted that the scanning wiring 16 and the signal wiring 14 may be inversely disposed depending on a design, where the scanning wiring 16 may be read as the signal wiring 14 in the description below. It is understood that such a case also ensures the effectiveness of the present disclosure. Same applies to the other embodiments.

On the first substrate 12 in FIGS. 1 and 2, the first electrode 13 is connected to the signal wiring 14 through a switching element 17. Moreover, the second electrode 18 is formed on the insulating film 15 and is used as a common electrode. For example, the switching element 17 here corresponds to a thin-film transistor which uses amorphous silicon for an active layer. The thin-film transistor is formed in the vicinity of each crossing portion of the multiple signal wirings 14 and the multiple scanning wirings 16. The scanning wiring 16 then functions as the gate electrode of the thin-film transistor, the signal wiring 14 functions as the drain electrode of the thin-film transistor, and the first electrode 13 functions as the source electrode of the thin-film transistor. In such a configuration, the signal voltage is applied to the signal wiring 14, and voltage for turning on the switching element 17 is applied to the scanning wiring 16. Accordingly, signal voltage is applied to the first electrode 13 through the switching element 17. Thereafter, voltage for turning off the switching element 17 is applied to the scanning wiring 16, to hold the signal voltage applied to the first electrode 13. Moreover, by the common voltage being applied to the second electrode 18 which is formed on the insulating film 15 and covers the surface portion of the first substrate 12, a fringe electric field formed by a potential difference (gradation driving voltage) between the first electrode 13 and the second electrode 18 is applied to the liquid crystal layer 20. The liquid crystal molecules 20a forming the liquid crystal layer 20 are then rotated in a plane substantially parallel to the first substrate 12 and the second substrate 22 by the fringe electric field. In order to apply the fringe electric field to the liquid crystal layer 20, the second electrode 18, of the two electrodes 13 and 18, located on the liquid crystal layer 20 side is provided with an opening 18a. It is noted that a transparent oxide semiconductor may also be employed for the switching element.

In the liquid crystal display panel 1 configured as described above, a region surrounded by adjacent signal wirings 14 and adjacent scanning wirings 16 defines one pixel, and a plurality of such pixels are arranged in matrix.

A backlight (not illustrated) is installed into the liquid crystal display panel 1 as described above, to complete the liquid crystal display apparatus.

Figure 4:
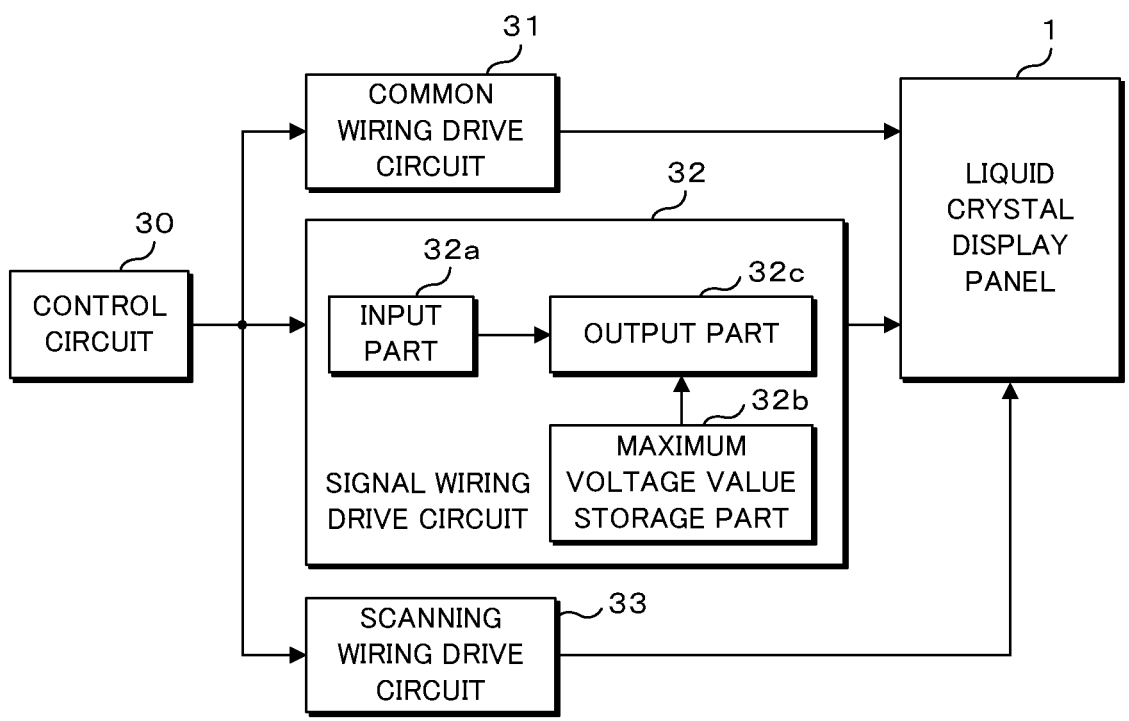
FIG. 4 is a block diagram illustrating an example of a drive circuit of the liquid crystal display panel according to Embodiment 1.

FIG. 4 is a block diagram illustrating an example of a drive circuit of the liquid crystal display panel 1 according to Embodiment 1. The drive circuit of the liquid crystal display panel 1 includes a common wiring drive circuit 31, a signal wiring drive circuit 32, a scanning wiring drive circuit 33, and a control circuit 30 controlling these circuits. The common wiring drive circuit 31 applies voltage (common voltage) to the second electrode 18 in accordance with the control by the control circuit 30. As for the common voltage, the voltage applied to the common electrode (second electrode 18) is assumed as 0V when seen from the liquid crystal layer 20. The scanning wiring drive circuit 33 sequentially applies voltage for turning on the switching element 17 to the scanning wiring 16 (gate electrode of the thin-film transistor) based on the power supply voltage from the power supply circuit (not illustrated) in accordance with the control by the control circuit 30.

The signal wiring drive circuit 32 applies signal voltage corresponding to each gradation value of image data to the signal wiring 14 (drain electrode of the thin-film transistor) based on the power supply voltage in accordance with the control by the control circuit 30. More specifically, the signal wiring drive circuit 32 includes an input part 32a, a maximum voltage value storage part 32b and an output part 32c. Image data is input to the input part 32a, and each gradation value of the input image data is sent to the output part 32c. The maximum voltage value storage part 32b stores a voltage value (maximum voltage value) corresponding to the maximum gradation value of image data, which sets the maximum value of the signal voltage applied to the signal wiring 14 by the signal wiring drive circuit 32. The output part 32c applies signal voltage of a voltage value corresponding to each gradation value obtained from the input part 32a to the signal wiring 14 in the range from 0V to the maximum voltage value. In comparison with the common voltage applied to the second electrode 18, the signal voltage is voltage (gradation driving voltage) corresponding to each gradation value of image data.

Figure 5:
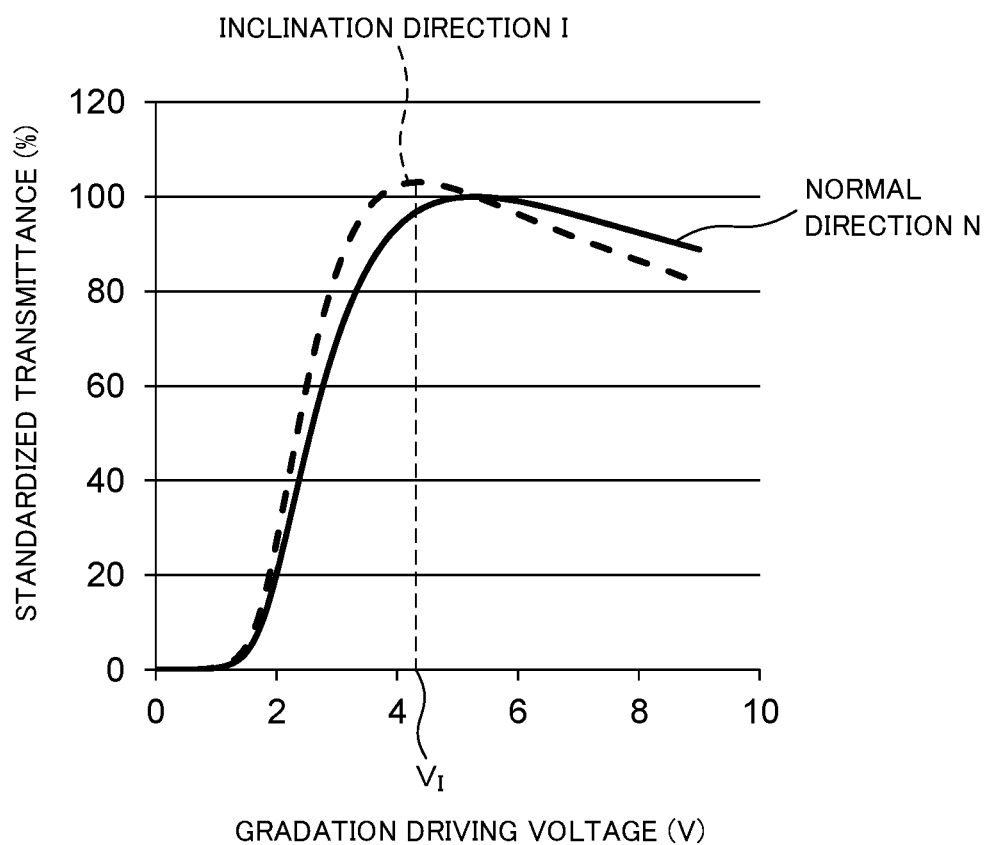
FIG. 5 is a graph illustrating an example of characteristics of standardized transmittance with respect to gradation driving voltage in the liquid crystal display panel.

FIG. 5 is a graph illustrating an example of the characteristics of standardized transmittance with respect to gradation driving voltage in the liquid crystal display panel 1. The standardized transmittance means the transmittance obtained when seen from various directions while assuming that the transmittance at the application of the peak voltage in the normal direction N is 100. In the following description, the characteristics of standardized transmittance with respect to gradation driving voltage is described as V-T characteristics. The solid line in FIG. 5 indicates the V-T characteristics in the case where an observation position P is viewed from the normal direction N of the display surface 1a, whereas the broken line indicates the V-T characteristics in the case where the observation position P is viewed from the inclination direction I. For example, as illustrated in FIG. 3B, the V-T characteristics in the inclination direction I indicated by the broken line is the V-T characteristics in the direction which is inclined from the normal direction N by an angle θ to the upper side of the alignment direction Q with respect to the observation position P in the plane R. In the case where the pretilt angle is θ degrees as in the present embodiment, the V-T characteristics in the direction inclined from the normal direction N by the angle θ to the lower side of the alignment direction Q with respect to the observation position P in the plane R shows characteristics similar to the V-T characteristics in the inclination direction I. Even in the case where a pretilt angle is not 0 degrees, the tendency remains while a slight difference may be observed. Thus, the following description continues with the case where the pretilt angle is 0 degrees as a typical example.

As can be seen from the graph illustrated in FIG. 5, in the liquid crystal display panel 1 of the FFS type, the V-T characteristics when the display surface 1a (observation position P) is viewed from the inclination direction I is shifted to the low voltage side compared to the V-T characteristics in the case where the display surface 1a is viewed from the normal direction N. That is, the standardized transmittance (simply referred to as transmittance in the description below) in the inclination direction I reaches a peak at voltage lower than that for the transmittance in the normal direction N.

The gradation driving voltage for driving the liquid crystal display panel 1 is decided based on the V-T characteristics when viewed from the normal direction N. More specifically, the gradation driving voltage is signal voltage in comparison with the common voltage, and is simply referred to as driving voltage in the following description. The liquid crystal display panel 1 is driven in a voltage range where the driving voltage value at which the transmittance in the normal direction N peaks is the voltage value corresponding to the maximum gradation value, i.e., the maximum voltage value. In the case where the liquid crystal display panel 1 is driven with such a voltage range, a high gradation region occurs where the transmittance at a high gradation value is lower than that at a low gradation value, when viewed from the inclination direction I. As such, if a portion where the gradation value and the luminance (transmittance) are inverted in their characteristics is generated, the image quality viewed from the inclination direction I is lowered.

In Embodiment 1, therefore, the liquid crystal display panel 1 is driven at the driving voltage which would not generate a portion where the characteristics of the gradation value and the luminance are inverted, even viewed from the inclination direction I. More specifically, based on the V-T characteristics when viewed from the inclination direction I, the driving voltage value ($V_1$ in FIG. 5) at which the transmittance in the inclination direction I peaks is assumed as the maximum voltage value to set the gradation voltage in the normal direction N, and the liquid crystal display panel 1 is driven within the voltage range.

By driving the liquid crystal display panel 1 in such a voltage range, the transmittance to the driving voltage is monotonously increased even in the V-T characteristics when viewed from the inclination direction I, not causing a voltage range where the characteristics of the gradation value and the luminance are inverted. This suppresses degradation in image quality even in the case of being viewed from the inclination direction I, which alleviates discomfort in the image quality that may be sensed by an observer.

In the drive circuit of the liquid crystal display panel 1, the signal wiring drive circuit 32 applies driving voltage of a voltage value corresponding to each gradation value of image data to the signal wiring 14 in the range up to the set maximum driving voltage value.

The direction in which the transmittance reaches a peak at lower driving voltage is specified among the V-T characteristics in the directions inclined from the normal direction N to the upper side or the lower side of the alignment direction Q, and the driving voltage of the liquid crystal display panel 1 may be decided based on the V-T characteristics in the specified direction.

Subsequently, in the V-T characteristics in the inclination direction I used to decide the range of the driving voltage (maximum driving voltage value) for driving the liquid crystal display panel 1, an inclination angle θ for the inclination direction I relative to the normal direction N will be described.

FIG. 6 is a graph illustrating the dependency of an index value ΔE* of variation in image quality in the case where the driving voltage for the liquid crystal display panel 1 is decided based on the V-T characteristics in the inclination directions I with different inclination angles θ. In FIG. 6, the horizontal axis represents the inclination angle θ for the inclination direction I relative to the normal direction N. The index value ΔE* represented by the vertical axis indicates, as an image quality, a color difference concerning an ivory color between the case of being viewed from the normal direction N and the case of being viewed from a diagonal direction inclined from the normal direction N with respect to the observation position P to the upper side of the alignment direction Q of the liquid crystal molecule 20a in the plane R. It is noted that the index value ΔE* corresponds to a distance between two points in the color space of the CIEL*a*b* color coordinate system.

In the case where the shade of color varies as the viewpoint is shifted from the normal direction N to a diagonal direction, the observer recognizes degradation in the image quality. In Embodiment 1, therefore, for evaluation of the image quality, the color difference ΔE* (degree of variation in the shade of color) between the case of being viewed from the normal direction N and the case of being viewed from the diagonal direction at an angle of θ degrees is used.

As for the allowable range for the degree of variation in the shade of color, various rules have been made based on a standard such as Japanese Industrial Standard (JIS). For example, a range where the color difference ΔE* is between 0 and 0.2 is called a non-evaluable range, and is defined as "a range not discriminable by a human being". Moreover, a range where the color difference ΔE* is between 0.2 and 0.4 is called a discrimination threshold, and is defined as "a threshold at which a trained person can discriminate the color difference with repeatability". Furthermore, a range where the color difference ΔE* is between 0.4 and 0.8 is called a grade AAA tolerance, and is defined as "a threshold at which a strict standard for the color tolerance may be set in view of the repeatability of visual judgment". Moreover, a range where the color difference ΔE* is between 0.8 and 1.6 is called a grade AA tolerance, and is defined as "a level at which a slight color difference may be sensed in the comparison of adjacent colors". In addition, a range where the color difference ΔE* is between 1.6 and 3.2 is called a grade A tolerance, and is defined as "a level at which a color difference is hardly noticed in the comparison of separated colors."

While Embodiment 1 employs a color difference in ivory for evaluation of the image quality, it is not limited thereto. The color used for evaluating the image quality is preferably a color for which the image quality is degraded when viewed from a diagonal direction. More specifically, a preferable color for evaluating the image quality may be, if separated into red (R), green (G) and blue (B), a color with any one of the values of R, G and B included in a range where the characteristics of the gradation values and the luminance are inverted in the V-T characteristics. As candidates therefor, light orange, pale orange and the like may be listed in addition to ivory.

As can be seen from the graph illustrated in FIG. 6, the color difference $\Delta E^*$ is decreased as the inclination angle $\theta$ for the inclination direction I is increased when the range of the driving voltage of the liquid crystal display panel 1 is decided based on the V-T characteristics in the inclination direction I.

In Embodiment 1, the range of the driving voltage for the liquid crystal display panel 1 may be decided such that the color difference $\Delta E^*$ is equal to or lower than 1.6, based on the definitions of tolerances described above. According to the graph illustrated in FIG. 6, the inclination angle $\theta$ for the inclination direction I needs to be approximately 40 degrees or larger in order to attain the color difference $\Delta E^*$ of 1.6 or smaller. That is, the color difference $\Delta E^*$ of 1.6 or smaller may be attained by deciding the range of the driving voltage for the liquid crystal display panel 1 based on the V-T characteristics in the inclination direction I having the inclination angle of approximately 40 degrees or larger. Since the inclination angle $\theta$ is an angle for the inclination direction I inclined from the normal direction N, it is required to be smaller than 90 degrees.

Accordingly, the range of the driving voltage (maximum driving voltage value) for the liquid crystal display panel 1 may also be decided based on the V-T characteristics in the inclination direction I with the inclination angle of approximately 60 degrees, for example. More specifically, in the liquid crystal display panel 1 after assembly, the V-T characteristics in the inclination direction I with the inclination angle $\theta$ of 60 degrees may be measured. That is, in the inclination direction I with the inclination angle $\theta$ of 60 degrees, the V-T characteristics indicated by the broken line in FIG. 5 is measured. Subsequently, in the measured V-T characteristics, the driving voltage value ($V_I$ in FIG. 5) at which the transmittance peaks is specified. The specified driving voltage value is then stored in the maximum voltage value storage part 32b in the signal wiring drive circuit 32, as the maximum voltage value of the gradation driving voltage applied to the signal wiring 14 by the signal wiring drive circuit 32.

This can attain the liquid crystal display panel 1 with the color difference $\Delta E^*$ of 1.6 or smaller.

It is noted that the inclination angle $\theta$ for the inclination direction I is not limited to an angle for attaining the color difference $\Delta E^*$ of 1.6 or smaller, but may be an angle for satisfying the standards depending on the purposes or the like of the liquid crystal display panel 1. For example, the inclination angle $\theta$ may be an angle for attaining the color difference $\Delta E^*$ of 1.4 or smaller, or an angle for attaining the color difference $\Delta E^*$ of 1.2 or smaller.

In Embodiment 1, the range of the driving voltage for the liquid crystal display panel 1 is decided based on the V-T characteristics when viewed from the inclination direction I.

More specifically, the liquid crystal display panel 1 is driven in the voltage range where the driving voltage value at which the transmittance in the inclination direction I peaks is set as the voltage value (maximum voltage value) corresponding to the maximum gradation value. This prevents the occurrence of a portion where the characteristics of the gradation value and the luminance (transmittance) are inverted even when viewed from the inclination direction I, suppressing degradation of image quality.

Embodiment 2

Figure 7:
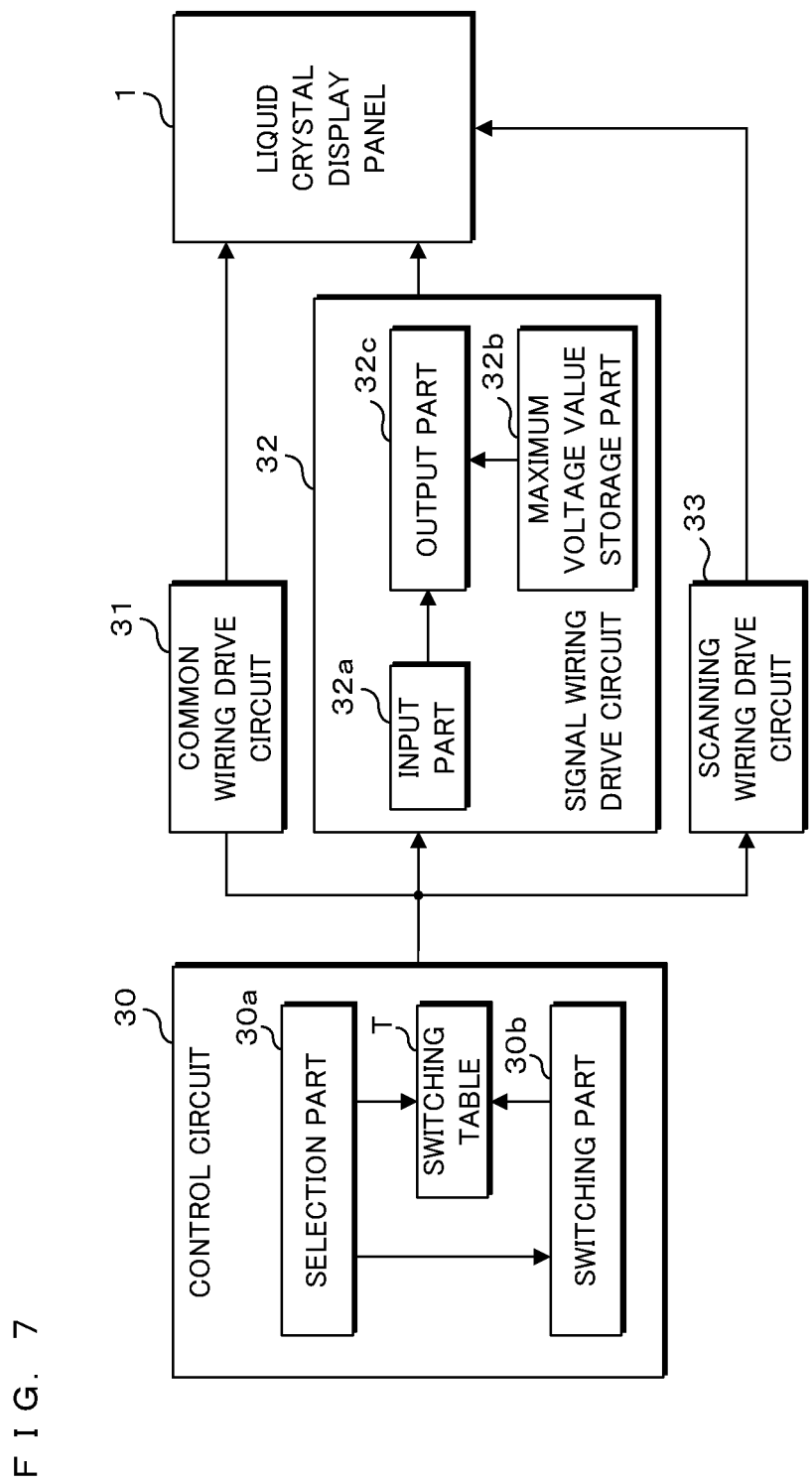
FIG. 7 is a block diagram illustrating an example of a drive circuit of a liquid crystal display panel according to Embodiment 2.

FIG. 7 is a block diagram illustrating an example of a drive circuit of the liquid crystal display panel 1 according to Embodiment 2. As the drive circuit of the liquid crystal display panel 1 according to Embodiment 2 has a configuration similar to the drive circuit of the liquid crystal display panel 1 according to Embodiment 1, the same components are denoted by the same reference codes and the description thereof will not be repeated. The common wiring drive circuit 31 and the scanning wiring drive circuit 33 in the drive circuit according to Embodiment 2 perform processing similarly to the circuits 31 and 33 in Embodiment 1.

In the drive circuit according to Embodiment 1, the maximum voltage value of the gradation driving voltage applied to the signal wiring 14 by the signal wiring drive circuit 32 is stored in the maximum voltage value storage part 32b in advance. In comparison, according to Embodiment 2, the maximum voltage value of the gradation driving voltage stored in the maximum voltage value storage part 32b may be changed. That is, the range of the gradation driving voltage may be changed.

The control circuit 30 in Embodiment 2 performs processing similarly to the control circuit 30 in Embodiment 1. Moreover, the control circuit 30 according to Embodiment 2 has a switching table T, and also performs processing of the selection part 30a and the switching part 30b.

The liquid crystal display panel 1 according to Embodiment 2 is so configured that the user may set the image quality (color difference $\Delta E^*$) through an operation unit (not illustrated). More specifically, four ranks are provided as the ranks for image quality, and operation by the user is accepted as an instruction for changing the current rank to a rank one higher than the current rank every time the user operates the operation unit. If the user operates the operation unit when the current rank is the highest rank, the liquid crystal display panel 1 accepts the operation as the instruction for changing the current rank to the lowest rank.

FIG. 8 is a schematic view illustrating a configuration example of a switching table T. The switching table (storage part) T stores therein ranks of image quality, ranges of color difference $\Delta E^*$ and maximum driving voltage values while associating them with one another. The ranks of image quality are for discriminating the ranges of color difference $\Delta E^*$ from each other. For example, a rank 1 is the highest rank, whereas a rank 4 is the lowest rank. The maximum driving voltage value is a driving voltage value at which the transmittance peaks in the V-T characteristics for an inclination direction I with the inclination angle $\theta$ which satisfies the range (predetermined reference) of the color difference $\Delta E^*$ corresponding to each rank.

In the switching table T, the number of ranks of image quality is not limited to four, or the ranges of color difference $\Delta E^*$ for the respective ranks are not limited to the examples illustrated in FIG. 8.

The current rank is stored in the selection part 30a. In the case where the liquid crystal display panel 1 accepts an instruction for changing the rank of image quality through the operation unit, the selection part 30a selects a rank to be employed, based on the current rank and the switching table T. For example, if one operation is performed on the operation unit when the current rank is the rank 3, the selection part 30a selects the rank 2 as the rank to be employed. The selection part 30a notifies the switching part 30b of the selected rank.

The switching part 30b reads out, from the switching table T, the maximum driving voltage value (e.g., V2) corresponding to the rank notified by the selection part 30a (e.g., rank 2). The switching part 30b then instructs the signal wiring drive circuit 32 to store the read maximum driving voltage value in the maximum voltage value storage part 32b of the signal wiring drive circuit 32. Accordingly, in the signal voltage applied to the signal wiring 14 by the signal wiring drive circuit 32, a voltage value corresponding to the maximum gradation value (maximum voltage value) can be switched to the maximum driving voltage value corresponding to the rank to be employed according to a change instruction. This allows the liquid crystal display panel 1 to be driven at the gradation driving voltage for attaining image quality desired by the user.

The setting for the rank of image quality by the user is not limited to the method as described above. For example, it may also be configured that the user may designate an arbitrary rank of the ranks 1 to 4 through the operation unit. Here, the liquid crystal display panel 1 accepts the operation of the user as a change instruction to an arbitrary rank. The switching part 30b then reads out, from the switching table T, the maximum driving voltage value corresponding to the rank to be employed according to the change instruction, and stores the read maximum driving voltage value in the maximum voltage value storage part 32b of the signal wiring drive circuit 32. In this case, the liquid crystal display panel 1 can also be driven at the gradation driving voltage for attaining image quality requested by the user.

In Embodiment 2 also, the range of the driving voltage for the liquid crystal display panel 1 is decided based on the V-T characteristics when viewed from the inclination direction I. This suppresses degradation in image quality even in the case of being viewed from the inclination direction I.

Moreover, according to Embodiment 2, the range of the driving voltage for the liquid crystal display panel 1 can be changed in accordance with an instruction from the user, which enables the image quality to be switched by the change in the range of the driving voltage. More specifically, the inclination angle θ of the inclination direction I in the V-T characteristics used in deciding the range of the driving voltage for the liquid crystal display panel 1 is changed. This can switch the image quality. Accordingly, an image quality desired by the user can be attained depending on the purpose of the user.

Embodiment 3

Figure 9:
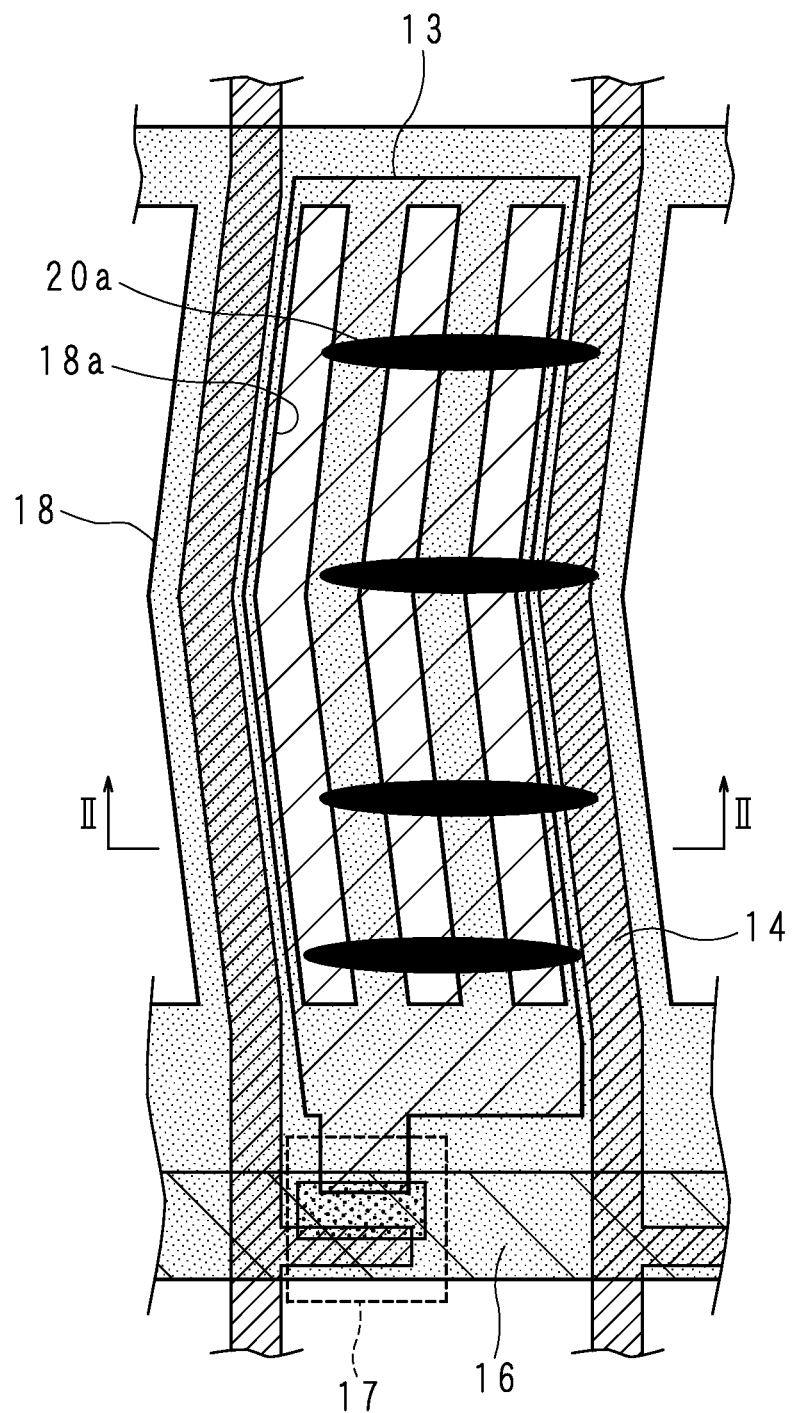
FIG. 9 is a plan view illustrating a configuration example of a liquid crystal display panel according to Embodiment 3.

FIG. 9 is a plan view illustrating a configuration example of a liquid crystal display panel 1 according to Embodiment 3.

While the liquid crystal molecule 20a according to Embodiment 1 or 2 is of a positive type, liquid crystal with negative dielectric anisotropy, i.e. a liquid crystal molecule 20a of a negative type may also be employed. In Embodiment 3, as illustrated in FIG. 9, the liquid crystal molecules 20a of the negative type are aligned in a direction substantially orthogonal to the extending direction of the signal wirings (data lines) 14 in each pixel, the direction being an alignment direction. Moreover, the alignment direction of the liquid crystal molecules 20a may also be a direction substantially parallel to the scanning wiring (gate line) 16 in each pixel.

In the case where the liquid crystal molecule 20a of the negative type is employed as in Embodiment 3, the liquid crystal display panel 1 having the configuration similar to Embodiments 1 or 2 can be attained. This can produce an effect similar to that in Embodiment 1 or 2.

In Embodiments 1 to 3 described above, the pixel structure has a bent part in one pixel, and is designed to have a multi-domain structure in one pixel where the rotating direction of electrons is inverted at the bent part serving as a boundary when the voltage is applied. However, it is understood that the effect of the present disclosure is not only effective in such a multi-domain structure, but also be maintained in a pseudo multi-domain structure so configured that adjacent pixels rotate in opposite directions, or also in a mono-domain structure in which all the pixels rotate in the same direction.

It is to be noted that the disclosed embodiment is illustrative and not restrictive in all aspects. The scope of the present disclosure is defined by the appended claims rather than by the description preceding them, and all changes that fall within metes and bounds of the claims, or equivalence of such metes and bounds thereof are therefore intended to be embraced by the claims.

It is to be noted that, as used herein and in the appended claims, the singular forms "a", "an", and "the" include plural referents unless the context clearly dictates otherwise.

What is claimed is:

1. A liquid crystal display apparatus, comprising:
a first substrate;
a first electrode formed on the first substrate;
an insulating film formed on the first electrode;
a second electrode formed on the insulating film;
a liquid crystal layer provided on the second electrode; and
a second substrate disposed in parallel to the first substrate on the liquid crystal layer,
wherein
a liquid crystal molecule in the liquid crystal layer is rotated in a plane parallel to the first substrate by driving voltage applied through the first electrode and the second electrode,
the first electrode is a plate-shaped transparent electrode that overlaps with a plurality of openings of the second electrode,
characteristics of transmittance with respect to driving voltage in a case where an observation point on the first substrate is viewed from a point on an inclined line, which is inclined from an orthogonal line passing the observation point and being orthogonal to the first substrate by a predetermined inclination angle of 90 degrees or less with respect to the observation point in a plane which includes a straight line in an alignment direction of liquid crystal molecule of the liquid crystal layer passing the observation point and which is orthogonal to the first substrate, reaches a peak at voltage lower than characteristics of transmittance with respect to driving voltage in a case where the observation point is viewed from a point on the orthogonal line passing the observation point and being orthogonal to the first substrate,
the liquid crystal display apparatus further comprises:
a storage part storing a maximum voltage value of the driving voltage to be applied to the liquid crystal molecule corresponding to a maximum gradation value among gradation values included in image data input to be displayed in the liquid crystal display apparatus; and a drive part applying driving voltage of a voltage value corresponding to each gradation value of the image data to the liquid crystal layer in a range from 0 to the maximum voltage value stored in the storage part, and the storage part stores, as the maximum voltage value, a driving voltage value with respect to a highest transmittance of the liquid crystal layer in the characteristics of transmittance with respect to driving voltage in a case where an observation point is viewed from a point on the inclined line.

2. The liquid crystal display apparatus according to claim 1, wherein the predetermined inclination angle is equal to or greater than 40 degrees.

3. The liquid crystal display apparatus according to claim 1, wherein the predetermined inclination angle is in a range of an angle at which a color difference in a specific color between a case where the observation point is viewed from a point on the orthogonal line and a case where the observation point is viewed from a point on a line inclined from the orthogonal line by a predetermined angle with respect to the observation point in the plane satisfies a predetermined reference.

4. The liquid crystal display apparatus according to claim 3, wherein the predetermined reference includes a plurality of different references, and the liquid crystal display apparatus further comprises:

a selection part selecting one of the plurality of references, and a switching part switching a maximum voltage value corresponding to the maximum gradation value to a driving voltage value for the highest transmittance of the liquid crystal layer in a case where the observation point is viewed from a point on the inclined line having an inclination angle satisfying the reference selected by the selection part.

5. The liquid crystal display apparatus according to claim 4, further comprising a storage part storing, in association with each of the plurality of references, a driving voltage value for the highest transmittance of the liquid crystal layer in a case where the observation point is viewed from a point on the inclined line having an inclination angle satisfying each of the plurality of references, wherein the switching part reads out a driving voltage value associated with a reference selected by the selection part from the storage part, and switches a maximum voltage value corresponding to the maximum gradation value to the read driving voltage value.

6. The liquid crystal display apparatus according to claim 1, wherein the liquid crystal molecule is of a positive type, and is aligned in a direction substantially parallel to a data line within each pixel.

7. The liquid crystal display apparatus according to claim 1, wherein the liquid crystal molecule is of a negative type, and is aligned in a direction substantially orthogonal to a data line within each pixel.

8. The liquid crystal display apparatus according to claim 1, wherein the liquid crystal molecule is of a positive type, and is aligned in a direction substantially orthogonal to a gate line within each pixel.

9. The liquid crystal display apparatus according to claim 1, wherein the liquid crystal molecule is of a negative type, and is aligned in a direction substantially parallel to a gate line within each pixel.

10. The liquid crystal display apparatus according to claim 6, wherein the liquid crystal layer has a mono-domain structure.

11. The liquid crystal display apparatus according to claim 7, wherein the liquid crystal layer has a mono-domain structure.

12. The liquid crystal display apparatus according to claim 8, wherein the liquid crystal layer has a mono-domain structure.

13. The liquid crystal display apparatus according to claim 9, wherein the liquid crystal layer has a mono-domain structure.

14. The liquid crystal display apparatus according to claim 6, wherein the liquid crystal layer has a pseudo multi-domain structure.

15. The liquid crystal display apparatus according to claim 7, wherein the liquid crystal layer has a pseudo multi-domain structure.

16. The liquid crystal display apparatus according to claim 8, wherein the liquid crystal layer has a pseudo multi-domain structure.

17. The liquid crystal display apparatus according to claim 9, wherein the liquid crystal layer has a pseudo multi-domain structure.

18. A liquid crystal display apparatus, comprising:

a first substrate;

a first electrode formed on the first substrate;

an insulating film formed on the first electrode;

a second electrode formed on the insulating film;

a liquid crystal layer provided on the second electrode; and a second substrate disposed in parallel to the first substrate on the liquid crystal layer, wherein a liquid crystal molecule in the liquid crystal layer is rotated in a plane parallel to the first substrate by driving voltage applied through the first electrode and the second electrode, the first electrode is a plate-shaped transparent electrode that overlaps with a plurality of openings of the second electrode, characteristics of transmittance with respect to driving voltage in an inclination direction inclined from a normal direction of the first substrate to an alignment direction of liquid crystal molecule of the liquid crystal layer, reaches a peak at voltage lower than characteristics of transmittance with respect to driving voltage in the normal direction, the liquid crystal display apparatus further comprises:

a storage part storing a maximum voltage value of the driving voltage to be applied to the liquid crystal molecule corresponding to a maximum gradation value among gradation values included in image data input to be displayed in the liquid crystal display apparatus; and a drive part applying driving voltage of a voltage value corresponding to each gradation value of the image data to the liquid crystal layer in a range from 0 to the maximum voltage value stored in the storage part, and the storage part stores, as the maximum voltage value, a driving voltage value with respect to a highest transmittance of the liquid crystal layer in the characteristics of transmittance with respect to driving voltage in the inclination direction inclined from a normal direction of the first substrate to an alignment direction of liquid crystal molecule of the liquid crystal layer.

19. A control circuit controlling driving voltage applied to a liquid crystal layer in a liquid crystal display apparatus, wherein the liquid crystal display apparatus comprises characteristics in which characteristics of transmittance with respect to driving voltage in an inclination direction inclined from a normal direction of a display surface to an alignment direction of liquid crystal molecule of the liquid crystal layer reaches a peak at voltage lower than characteristics of transmittance with respect to driving voltage in the normal direction, the control circuit comprising:

- a storage part storing a driving voltage value with respect to a highest transmittance of the liquid crystal layer in the characteristics of transmittance with respect to driving voltage in the inclination direction inclined from the normal direction of the display surface of the liquid crystal display apparatus to an alignment direction of liquid crystal molecule of the liquid crystal layer, as a maximum voltage value of driving voltage to be applied to the liquid crystal molecule corresponding to a maximum gradation value among gradation values included in image data input to be displayed in the liquid crystal display apparatus;
- an input part to which a gradation value is input; and
- an output part applying driving voltage of a voltage value corresponding to a gradation value input to the input part to the liquid crystal layer, in a range from 0 to the maximum voltage value stored in the storage part.

* * * * *